United States Patent
Luft et al.

(10) Patent No.: US 9,077,543 B2
(45) Date of Patent: Jul. 7, 2015

(54) METHODS AND APPARATUS FOR DIGITAL ATTESTATION

(75) Inventors: Achim Luft, Brauschweig (DE); Maik Bienas, Braunschweig (DE); Andreas Schmidt, Brauschweig (DE)

(73) Assignee: Apple Inc., Cupertino, CA (US)

( * ) Notice: Subject to any disclaimer, the term of this patent is extended or adjusted under 35 U.S.C. 154(b) by 1200 days.

(21) Appl. No.: 12/576,989

(22) Filed: Oct. 9, 2009

(65) Prior Publication Data

US 2011/0087887 A1    Apr. 14, 2011

(51) Int. Cl.
| | |
|---|---|
| G06F 7/04 | (2006.01) |
| H04L 9/32 | (2006.01) |
| H04W 12/10 | (2009.01) |
| H04L 29/06 | (2006.01) |
| G06Q 50/28 | (2012.01) |
| H04W 64/00 | (2009.01) |
| H04W 12/12 | (2009.01) |

(52) U.S. Cl.
CPC ............. *H04L 9/3247* (2013.01); *H04L 63/107* (2013.01); *G06Q 50/28* (2013.01); *G06F 2221/2111* (2013.01); *H04W 64/00* (2013.01); *H04L 9/3297* (2013.01); *H04L 2209/56* (2013.01); *H04L 2209/805* (2013.01); *H04W 12/10* (2013.01); *H04W 12/12* (2013.01)

(58) Field of Classification Search
CPC ....................... H04L 63/107; G06F 2221/2111
USPC ............................................................. 726/3
See application file for complete search history.

(56) References Cited

U.S. PATENT DOCUMENTS

| | | | |
|---|---|---|---|
| 6,102,287 | A | 8/2000 | Matyas, Jr. |
| 7,323,988 | B2 | 1/2008 | Krstulich |
| 7,378,939 | B2 * | 5/2008 | Sengupta et al. ............ 340/5.64 |
| 7,774,268 | B2 | 8/2010 | Bradley |
| 8,049,594 | B1 * | 11/2011 | Baranowski ................ 340/5.61 |
| 8,282,475 | B2 | 10/2012 | Nguyen |
| 2004/0078334 | A1 | 4/2004 | Malcolm |
| 2006/0071791 | A1 | 4/2006 | Meyers |
| 2007/0010956 | A1 * | 1/2007 | Nerguizian et al. ............. 702/57 |
| 2008/0182592 | A1 * | 7/2008 | Cha et al. ................... 455/456.3 |
| 2008/0223930 | A1 | 9/2008 | Rolland |

(Continued)

OTHER PUBLICATIONS

Haselsteiner, Security in Near Field Communication (NFC), 2006, retreived from the Internet <URL: events.iaik.tugraz.at/RFIDSec06/Program/papers/002%20-%20Security%20in%20NFC.pdf>, pp. 1-11 as printed.*

(Continued)

*Primary Examiner* — Michael Chao
(74) *Attorney, Agent, or Firm* — Downey Brand LLP

(57) ABSTRACT

Methods and apparatus for providing proof of multiple entities being co-located at a specific time and location. An attestor transmits an attestation message via short range communication; the attestation message includes a time stamp, a location stamp, and a verifiable digital signature. An attestee that stores the attestation message can produce the attestation message at a later time to any interested party, as proof of co-location with the attestor at the specified time and location. In one exemplary embodiment, the methods and apparatus are substantially "open" for public implementation. Such public implementation enables attestors and attestees without prior affiliation, to provide attestation. Furthermore, the device-agnostic methods and apparatus can provide attestation capabilities even in previously deployed systems and devices.

19 Claims, 12 Drawing Sheets

(56) References Cited

U.S. PATENT DOCUMENTS

2008/0249899 A1 10/2008 Nasser
2010/0057485 A1 3/2010 Luft
2010/0207732 A1* 8/2010 Patwari et al. ............... 340/10.1

OTHER PUBLICATIONS

Zhang et al.; FluidMedia: an offline peer-to-peer media transaction system; 2002; Retrieved from the Internet <URL: hpl.hp.com/techreports/2002/HPL-2002-342.html>; pp. 1-7 as printed.*

Denning et al.; Location-Based Authentication: Grounding Cyberspace for Better Security; 1996; Retrieved from the Internet <URL: sciencedirect.com/science/article/pii/S1361372397826139>; pp. 1-5 as printed.*

Ghanname, Taoufik; How NFC can to speed Bluetooth transactions-today; 2006; Retrieved from the Internet <URL: eetimes.com/documentasp?doc_id=1273409>; pp. 1-6 as prtined.*

(No stated author); WebSEAL Administration Guide v. 5.1; 2003; Retrieved from the Internet <URL: http://publib.boulder.ibm.com/tividd/td/ITAME/SC32-1359-00/en_US/PDF/am51_webseal_guide.pdf>; pp. 1-44 as printed.*

Tablas et al.; Survey on Location Authentication Protocols and Spatial-Temporal Attestation Services; 2005; Retrieved from the Internet <URL: seg.inf.uc3m.es/papers/2005euc.pdf>; pp. 1-10 as printed.*

Iso/Iec 18092:2004 "Information technology — Telecommunications and information exchange between systems — Security in Near Field Communication (Nfc) — Interface and Protocol (Nfcip-I)" 2004. By Ernst Haselsteiner and Kiemens Breitful3, I 1 pp.

* cited by examiner

```
Certificate:
    Data:
        Version: 2 (0x2)
        Serial Number: 1 (0x1)
        Signature Algorithm: md5WithRSAEncryption
        Issuer:
            C=  US,
            ST= California,
            L=  San Francisco,
            O=  John Doe,
            OU= 75:8f:9b:10:f0:15:f0:9e
    Validity:
            Not Before: Oct 29 17:39:10 2008 GMT
            Not After:  Oct 29 17:39:10 2009 GMT
    Location:
            C=  US,
            ST= California,
            L=  San Francisco,
            Z=  95014-3202
            S=  11 Elmstreet 242
    GPS=
            Magellan
            $GPGGA, 184050.84,3907.3839,N,12102.4772,W,1,05,1.8,00543,M,,,,*33
            $GPRMC, 184050.84,A,3907.3839,N,12102.4772,W,00.0,000.0,080301,15,E*54
            $GPGSA,A,3,24,07,09,26,05,,,,,,,,03.6,01.8,03.1*05
            $PMGNST,02.12,3,T,534,05.0,+03327,00*40
            $GPGLL,3907.3839,N,12102.4771,W,184051.812,A*2D
            $GPGGA,184051.81,3907.3839,N,12102.4771,W,1,05,1.8,00543,M,,,,*34
            $GPRMC,184051.81,A,3907.3839,N,12102.4771,W,00.0,000.0,080301,15,E*53
            $GPGSA,A,3,24,07,09,26,05,,,,,,,,03.6,01.8,03.1*05
            $GPGSV,3,1,08,07,57,045,43,09,48,303,48,04,44,144,,02,39,092,*7F
            $GPGSV,3,2,08,24,18,178,44,26.17,230,41,05,13,292,43,08,01,147,*75
            $GPGSV,3,3,08,,,,,,,,,,,,,,,,*71
            $GPGLL,3907.3840,N,12102.4770,W,184052.812,A*21
    Timestamp=
            1234281600
    Nonce   (1024 bit):
            00:c4:40:4c:6e:14:1b:61:36:84:24:b2:61:c0:b5:
            d7:e4:7a:a5:4b:94:ef:d9:5e:43:7f:c1:64:80:fd:
            9f:50:41:6b:70:73:80:48:90:f3:58:bf:f0:4c:b9:
            90:32:81:59:18:16:3f:19:f4:5f:11:68:36:85:f6:
            1c:a9:af:fa:a9:a8:7b:44:85:79:b5:f1:20:d3:25:
            7d:1c:de:68:15:0c:b6:bc:59:46:0a:d8:99:4e:07:
            50:0a:5d:83:61:d4:db:c9:7d:c3:2e:eb:0a:8f:62:
            8f:7e:00:e1:37:67:3f:36:d5:04:38:44:44:77:e9:
            f0:b4:95:f5:f9:34:9f:f8:43
Signature Algorithm:  md5WithRSAEncryption
    12:ed:f7:b3:5e:a0:93:3f:a0:1d:60:cb:47:19:7d:15:59:9b:
    3b:2c:a8:a3:6a:03:43:d0:85:d3:86:86:2f:e3:aa:79:39:e7:
    82:20:ed:f4:11:85:a3:41:5e:5c:8d:36:a2:71:b6:6a:08:f9:
    cc:1e:da:c4:78:05:75:8f:9b:10:f0:15:f0:9e:67:a0:4e:a1:
    4d:3f:16:4c:9b:19:56:6a:f2:af:89:54:52:4a:06:34:42:0d:
    d5:40:25:6b:b0:c0:a2:03:18:cd:d1:07:20:b6:e5:c5:1e:21:
    44:e7:c5:09:d2:d5:94:9d:6c:13:07:2f:3b:7c:4c:64:90:bf:
    ff:8e
```

210 (Certificate)
214 — Issuer
216 — Validity
218 — Location
204 — GPS
202 — Timestamp
212 — Nonce
206 — Signature

FIG. 2A

$GPAAM - Waypoint Arrival Alarm
$GPALM - GPS Almanac Data
$GPAPA - Autopilot Sentence "A"
$GPAPB - Autopilot Sentence "B"
$GPASD - Autopilot System Data
$GPBEC - Bearing & Distance to Waypoint, Dead Reckoning
$GPBOD - Bearing, Origin to Destination
$GPBWC - Bearing & Distance to Waypoint, Great Circle
$GPBWR - Bearing & Distance to Waypoint, Rhumb Line
$GPBWW - Bearing, Waypoint to Waypoint
$GPDBT - Depth Below Transducer
$GPDCN - Decca Position
$GPDPT - Depth
$GPFSI - Frequency Set Information
$GPGGA - Global Positioning System Fix Data
$GPGLC - Geographic Position, Loran-C
$GPGLL - Geographic Position, Latitude/Longitude
$GPGSA - GPS DOP and Active Satellites
$GPGSV - GPS Satellites in View
$GPGXA - TRANSIT Position
$GPHDG - Heading, Deviation & Variation
$GPHDT - Heading, True
$GPHSC - Heading Steering Command
$GPLCD - Loran-C Signal Data
$GPMTA - Air Temperature (to be phased out)
$GPMTW - Water Temperature
$GPMWD - Wind Direction
$GPMWV - Wind Speed and Angle
$GPOLN - Omega Lane Numbers
$GPOSD - Own Ship Data
$GPROO - Waypoint active route (not standard)
$GPRMA - Recommended Minimum Specific Loran-C Data
$GPRMB - Recommended Minimum Navigation Information
$GPRMC - Recommended Minimum Specific GPS/TRANSMIT Data
$GPROT - Rate of Turn
$GPRPM - Revolutions
$GPRSA - Rudder Sensor Angle
$GPRSD - RADAR System Data
$GPRTE - Routes
$GPSFI - Scanning Frequency Information
$GPSTN - Multiple Data ID
$GPTRF - Transit Fix Data
$GPTTM - Tracked Target Message
$GPVBW - Dual Ground/Water Speed
$GPVDR - Set and Drift
$GPVHW - Water Speed and Heading
$GPVLW - Distance Traveled through the Water
$GPVPW - Speed, Measured Parallel to Wind
$GPVTG - Track Made Good and Ground Speed
$GPWCV - Waypoint Closure Velocity
$GPWNC - Distance, Waypoint to Waypoint
$GPWPL - Waypoint Location
$GPXDR - Transducer Measurements
$GPXTE - Cross-Track Error, Measured
$GPXTR - Cross-Track Error, Dead Reckoning
$GPZDA - Time & Date
$GPZFO - UTC & Time from Origin Waypoint
$GPZTG - UTC & Time to Destination Waypoint

FIG. 2B

METHODS AND APPARATUS FOR DIGITAL ATTESTATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communications. More particularly, in one exemplary aspect, the present invention is directed to enhanced methods and apparatus for recordation, and verification of events by digital attestation for digital signature and verification.

2. Description of Related Technology

Despite current trends for the virtualization of many business operations, "traditional" business models involving services, goods, and/or deliveries are still fundamentally physical transactions. In response to customer demands for increasing transparency, many businesses provide records of times and locations of transactions (e.g., delivery of goods, services performed). Unfortunately, prior art solutions for recording such transactions have been unsatisfactory on a number of levels.

Anecdotally, a customer may wait for hours for a repair man and step out briefly, only to return to find a note indicating a missed arrival. The notorious difficulty of scheduling repair has become virtually synonymous with unpredictability. Similarly, an honest delivery person may leave a package on a doorstop, and find later that the recipient has disavowed receipt. While it is common business practice to leave a note, and perhaps even schedule "retry" attempts, such messages are often in handwriting, and cannot be reliably certified by either party (i.e., the note writer, or the note reader). Clearly, the lack of accountability for either party can be exploited for fraudulent or unethical purposes.

Several solutions have been proposed for "presence" verification in such cases. For example, some prior art solutions provide a record of the time and/or location, along with an acknowledgment (e.g., a handwritten signature of the recipient). One drawback of prior art solutions is that they require action from at least two parties: the attestor (i.e., the signing party), and the attestee (i.e., the requesting party). If either of the parties is not present, the recordation cannot be performed. Another drawback of prior art solutions is that they do not provide sufficient security for the attestation. For example, a handwritten signature may be forged, or later denied.

Other solutions may be generally "closed" systems; in closed systems, both the attestor and the attestee already have a preexisting relationship. For instance, fleet tracking systems provide tracking information for the members of the fleet. Similarly, workforce monitoring systems track each member of the workforce. Closed systems are simple to implement, and widely used; however, they are limited to a closed group. Unfortunately, in customer service applications, the customer seldom has a pre-existing relationship with the service or goods provider.

Accordingly, improved solutions are needed for presence verification and location tracking. More specifically, improved methods and apparatus are needed to securely and reliably identify and verify the physical location and time of a person, thing, and/or occurrence. Such improved methods and apparatus may greatly benefit customers, and businesses alike. Customers may be assured that their requested services and goods are delivered promptly, and honestly. Likewise, businesses can improve operational efficiency, and reduce or prevent fraud, in a straightforward and easy to implement fashion.

SUMMARY OF THE INVENTION

The present invention satisfies the foregoing needs by providing, inter alia, methods and apparatus for digital signature and verification. In one aspect of the present invention methods for recordation and verification of events by digital attestation are disclosed.

In a first aspect of the invention, an apparatus adapted to generate a digital attestation is disclosed. In one embodiment, the apparatus includes: a radio interface; apparatus for providing a time reference; apparatus for providing a location reference; a processing device; and computer readable apparatus comprising a medium adapted to store a computer program. The computer program is configured to, when executed by the processing device, generate a digital attestation by: determination of a location stamp from the apparatus for providing a location reference; determination of a time stamp from the apparatus for providing a time reference; and generation of a digital attestation, wherein the digital attestation includes the location stamp, the time stamp, and a secure signature.

In one variant, the computer program is further configured to, when executed; transmit the digital attestation to the first device; and record an attestation event.

In another variant, the digital attestation is generated responsive to the receipt of a request for digital attestation from a first device.

In yet another variant, the apparatus for attestation is configured to communicate with other devices via a common open protocol. The common open protocol is for example device-agnostic, so that it may be readily installed on any type of device and be compatible with any other installation. The radio interface also optionally includes a standardized air interface compatible with the common open protocol.

In still a further variant, the radio interface includes a near-field communication (NFC) interface compliant with ISO/IEC Standard 18092:2004. Alternatively, the radio interface includes a WLAN or Bluetooth interface, the apparatus includes a cellular smartphone, and the computer program is an application program added to the medium after the purchase of the smartphone by a user (e.g., installation on a "legacy" device).

In another variant, the secure signature includes a digital signature generated by a cryptographic hashing algorithm, or alternatively a signature generated based at least in part on one or more physical radio frequency channel parameters (e.g., channel impulse response (CIR)).

In a second aspect of the invention, a method for securely recording the co-location of a first device and a second device at a time and a location is disclosed. In one embodiment, the method includes: determining a location stamp of the second device; determining a time stamp of the second device; generating an attestation comprising a secure signature of the second device, the location stamp, and the time stamp; and transmitting the attestation to the first device.

In one variant, the method further includes the second device receiving a request for attestation from the first device, and at least the generating of the attestation being in response to the request.

In another variant, the method further includes: receiving at the second device a beacon or probe signal from the first device; responsive to the receiving of the probe or beacon, causing a negotiation between the first device and second device; and upon the successful completion of the negotiation, causing at least the act of generating.

In yet another variant, the method further includes causing the first device to: determine a location stamp of the first device; determine a time stamp of the first device; generate a second attestation comprising a secure signature of the first device, the location stamp, and the time stamp; and transmit the second attestation to the second device. At least one attribute of the attestation and the second attestation can be compared to determine the level of similarity.

In a third aspect of the invention, an apparatus configured to receive a digital attestation is disclosed. In one embodiment, the apparatus receives the attestation from a second arbitrary device, and includes: a radio interface; a processing device; and computer readable apparatus comprising a medium adapted to store a computer program. The computer program is configured to, when executed by the processing device, receive and stores a digital attestation from the second arbitrary device, the digital attestation comprising a location stamp, a time stamp, and a digital signature generated by the second arbitrary device; wherein the apparatus and the second arbitrary device do not have any prior affiliation with one another.

In one variant, the computer program is further configured to determine if the digital signature is valid, and if the digital signature is valid, record the digital attestation.

In another variant, the receipt of the digital attestation includes receipt of a message formatted according to an open standard protocol.

In a fourth aspect of the invention, a computer readable apparatus is disclosed. In one embodiment, the apparatus includes a storage medium, the medium containing at least one computer program which, when executed by a computerized device: obtains a current location reference; obtains a current time reference; generates a cryptographic signature element based on one or more cryptographic algorithms; and transmits the location reference, time reference, and cryptographic element to another computerized device via a wireless interface and according to a non-device specific attestation protocol.

In a fifth aspect of the invention, a method of doing business is disclosed. In one embodiment, the method comprises charging at least one of a shipper or recipient of goods consideration for a digital attestation, the digital attestation providing substantially unequivocal proof of delivery of the goods at a particular location and a particular time based at least in part on a digital cryptographic element.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2A is a graphical illustration showing an exemplary implementation of the digital attestation message of FIG. 2.

FIG. 2B is a text listing of several commonly used GPS-specific location stamp "sentences" useful with one or more embodiments of the invention.

DETAILED DESCRIPTION OF THE INVENTION

Reference is now made to the drawings, wherein like numerals refer to like parts throughout.

Overview

The present invention discloses, inter alia, methods and apparatus that provide digital attestation for the recordation and/or verification of events. As disclosed in greater detail herein with regard to one exemplary embodiment, an attestee device and an attestor device generate and store a digital attestation; the digital attestation provides a time stamp, a location stamp, and a digital signature. In some implementations, the digital attestation additionally includes other information including e.g., human readable data, header information, etc. The digital attestation provides an irrefutable account of the attestee device and attestor device at the specified time and location. Certain "automated" embodiments of the invention advantageously do not require any human action to trigger an attestation exchange.

In one embodiment, both attestee and attestor devices are actively engaged in the generation and storage of the digital attestation. Since both devices (i.e., the attestee and attestor) maintain a record of the attestation, later fallacious or unsubstantiated claims by a human party corresponding to either device can be quickly and unequivocally dismissed without merit. The digital signature of the attestation ensures that the original attestation is an authentic and irrefutable account of the time and location specified.

In one implementation of the invention, the attestee and attestor operate using an "open" protocol. Thus, the process for requesting, generating and storing the digital attestation is device- and/or vendor-agnostic. A device operating with the open attestation protocol can freely negotiate attestation with other devices, without having any previous affiliation. In fact, in one embodiment, the attestation protocol software can be executed on preexisting hardware such as WLAN access points, femtocells, cell phones, etc. These minimal requirements for device hardware allow for simple incorporation of the functionality of the invention into new device designs, and inexpensive upgrades or retrofits for existing/legacy devices.

Detailed Description of Exemplary Embodiments

Exemplary embodiments of the present invention are now described in detail. The following illustrative example introduces one simplified embodiment to aid in initial understanding of the concepts of the present invention. Greater detail is provided in subsequent sections further demonstrating the principles of the invention with respect to other embodiments.

Figure 1:
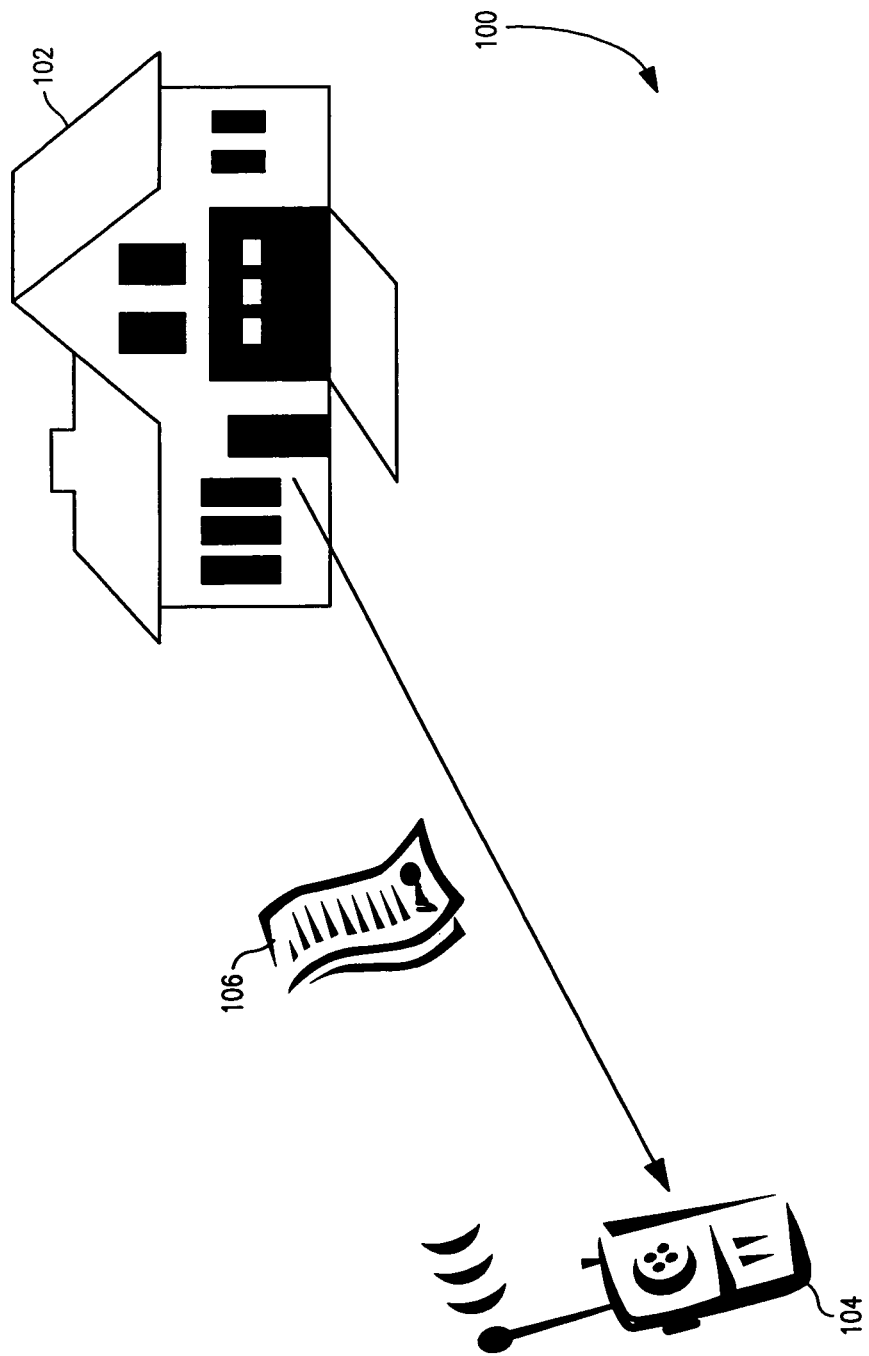
FIG. 1 is a graphical illustration of one wireless system, comprising an attestor and an attestee, in accordance with one embodiment of the present invention.

FIG. 1 illustrates one exemplary wireless system 100 configured in accordance with one embodiment of the present invention. The wireless system includes at least two (2) entities, the attestor 102 and the attestee 104. The attestor is the party providing the attestation 106. The attestee is the party receiving the attestation. Due to the possible ambiguity of such terms as "recipient" and "provider" (e.g., the recipient of the attestation could be the provider of the goods or services), as used hereinafter such terms are in relation to the attestation message. Accordingly, it will be recognized that the terms "attestee" and "recipient", as used herein refers, without limitation, to the recipient of the attestation. Similarly, the term "attestor" and "provider" as used herein refers, without limitation, to the provider of the attestation.

Example Use Case—

John Doe places an order for an item via the Internet. The delivery service arrives at his apartment while he is not at home. There is a sign next to John Doe's apartment mailbox name plate that reads "Electronic location tag". The name plate (or nearby apparatus) is an attestor device 102, employing a short-range wireless transceiver (such as e.g., Bluetooth or PAN IEEE Std. 802.15). The delivery person places his mobile attestee device 104 in front of the sign, and presses a button on the attestee device. The attestee device sends a request for an attestation message or "stamp" to the attestor device 102. The request message contains the name of the delivery service, and the shipment reference number. The attestor device 102 receives the request message, stores the request in a recording apparatus (e.g., an automated answering device, a server, a network, etc.), and generates an attestation message 106.

Later, when John returns home, the attestor apparatus' 102 user interface (UI) indicates the new event(s). All events occurring during John's absence are displayed on a monitor next to John's front door. The failed delivery with the related shipment reference number is read by John (along with any other records). The delivery service/delivery person has stored the attestation message 106 as evidence that the delivery service made a physical attempt to deliver the order at the attested time. John has the stored attestation message for his personal records. Thus, the delivery attempt data is electronically stored by both parties, and can be processed, archived, replicated, or used to trigger further action by either the John Doe or the delivery service.

The foregoing use scenario illustrates several distinctive aspects of the present invention. Firstly, the attestee (the delivery person's mobile device) and attestor (name plate) are not affiliated with one another. Unlike prior art closed attestation systems, the present invention can be used to widely distribute an open protocol for physical or virtual implementation on a wide variety of platforms, whereby any device supporting the attestation protocol can freely attest, or be attested to by another device. As alluded to previously, the attestation process can reuse existing radio devices (such as cell phones, femtocells, etc.), or may be implemented in dedicated attestation devices equally well.

Furthermore, the foregoing exemplary use scenario requires active participation by both attestation devices. Thus, direct feedback is provided to both the attestee and attestor; or more specifically the owners of the attestee and attestor devices. The mutual recording of the attestation advantageously keeps both owners "honest". In a similar vein, the certificates (stored in the attestee and attestor) are robustly protected from manipulation.

Finally, as described in greater detail subsequently herein, the attestation message may also provide additional information or functionality, such as a message for further delivery instructions, or details.

Other beneficial aspects of the present invention will be made apparent to those having ordinary skill in the arts, given the contents of the present disclosure.

Attestation Message—

Figure 2:
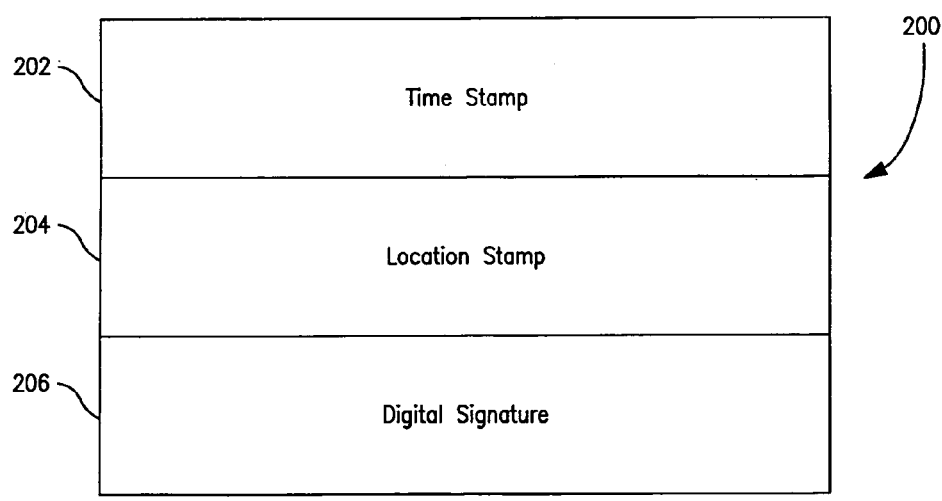
FIG. 2 is a graphical illustration of one embodiment of a generalized digital attestation message in accordance with one embodiment of the invention.

FIG. 2 illustrates one exemplary embodiment of an attestation message 200 according to the present invention. The attestation message of FIG. 2 comprises: (i) a time stamp 202, (ii) a location stamp 204, and (iii) a digital signature 206, as now described in greater detail.

The time stamp 202 indicates the time at which an attestation event occurred. In one embodiment, the time stamp is based on an internal time base, such as a running clock, or crystal oscillator, within the attestation device. In alternate embodiments, the time stamp is provided by an external time base (such as via a received GPS communication or signal, IEEE 1588, etc.). Yet other methods of timekeeping (i.e., radioactive decay, access to an Internet website, use of a cellular network clock reference, etc.) will be recognized by those having ordinary skill in the arts, given the contents of the present disclosure. In some embodiments, the attestation includes a textual (human readable) string format time stamp (e.g., HH:MM:SS, DD:MM:YY, etc.). In other embodiments, the attestation includes a computer readable format time stamp (e.g., an incrementing counter, etc.). In yet other embodiments, the attestation message includes both human readable and computer readable time stamps, so as to facilitate both automated data entry and human cognizance/data entry.

A location stamp 204 indicates the location at which an attestation event occurred. In one embodiment, the location stamp is based on a location positioning reference such as the well known and virtually ubiquitous Global Positioning System (GPS). In other embodiments, the location stamp is a coordinate system format (e.g., latitude, longitude, etc.). In yet other alternate embodiments, the location stamp is provided by an external interface, or informational service. These external sources may include for example a cellular or WLAN network, or RFID/near-field system; e.g., association with a particular base station, access point, RFID portal or near-field communication system) or other node having a known location may indicate a certain geographic proximity to that device. The use of these different sources may also depend on the requisite degree of location accuracy required for attestation. For instance, in a rural area with low population density, a positional error band or uncertainty of one-half mile may be inconsequential (since all houses or structures may be several miles from one another). However, that same error/uncertainty in an urban environment would be useless, since much more accurate positioning of the attestation is required due to high population density.

In other embodiments, the attestation message 200 includes a computer readable format location stamp 204. In yet other embodiments, the attestation message includes both human readable and computer readable location stamps.

As shown, the attestation message of FIG. 2 also includes a digital signature 206. The digital signature provides non-repudiation properties to the attestation message; i.e., so that the digital signature cannot be altered by either the attestor or attestee. The attestation message is valid if: (i) the integrity of a digital signature is intact and (ii) the digital signature is genuine. A failure in either of the conditions renders the stamp invalid. Other failure conditions can be used to determine validity of the stamp and are described in greater detail hereinafter.

Data integrity is performed using a data hash, such as MD5, SHA1, SHA2, etc. Hash functions convert a large, possibly variable-sized amount of data into a small index. While a hash is not unique (i.e., multiple data can have the same hash), it is very difficult to change a small portion of the data while retaining the same hash value. Thus, a correct data hash result is generally sufficient to establish data integrity.

In one exemplary embodiment, the digital signature additionally provides cryptography-based protection. In one such variant, public/private key cryptography is coupled with the digital signature to ensure validity. Public/private key cryptography is well known in the related arts, and widely used. Briefly, public/private key cryptography uses an asymmetric key pair to encrypt and decrypt. The asymmetric key pair consists of a "public" key and a corresponding "private" key. The private key is kept secret, whereas the public key is freely distributed. Messages are encrypted with the public key and can only be decrypted with the corresponding private key.

One typical digital signature scheme consists of three algorithms: (i) a key generation algorithm that selects a private key uniformly at random from a set of possible private keys. The algorithm outputs the private key and a corresponding public key; (ii) a signing algorithm which, given a message (e.g., attestation message 200) and a private key, produces a digital "signature"; and (iii) a signature verifying algorithm which, given a message, public key and a signature, either accepts or rejects. Hence, the combination of the message and selected key combine to form a unique signature.

In another variant, a digital hash is encrypted with a public key or "secret" to generate the signature. During signature verification, the digital hash must be decrypted with the corresponding private key. This private key cannot be guessed by a malicious party, nor could the malicious party regenerate a valid signature without the private key. In such embodiments, a "Trust Center" (e.g., trusted authority of the type well known in the security arts) or other such entity may be used to store and provide key pairs. Once the Trust Center has verifies the identity of the party requesting the corresponding private or public key before providing the key.

It will be appreciated that other methods and types of cryptography may be substituted, the foregoing being merely illustrative. The manner and types of context information substituted are well known to those of ordinary skill in the art given the contents of the present disclosure.

Upon later examination, the attestation's authenticity is verified with the digital signature. If the digital signature is valid, then the attestee and attestor have proven their contemporaneous co-location at the time and location, specified by the embedded time and location stamps (202, 204). Such information can also be used for so-called "non-repudiation" protection; i.e., where one party attempts to say that the signature was not theirs.

The attestation message of FIG. 2 may additionally be modified to provide other components, such as for example: (i) a nonce 212, (ii) header information 214, (iiii) validity periods 216, and (iv) text readable addressing 218, etc. each of the aforementioned additional components is now discussed in greater detail with respect to an exemplary attestation message format 210 of FIG. 2A.

Certain implementations of digital signatures 206 of the type described above may require or provide a random number, cryptographic "salt", or "nonce" 212 (i.e., "number used once"). A nonce is a random number seed used during security operations to prevent certain types of malicious attacks (e.g., replay, and dictionary type attacks). One embodiment of such a nonce is shown in FIG. 2A. For each request, the nonce is generated anew; thus, each request has a unique seed making replay and dictionary attacks virtually impossible for a malicious party.

Furthermore, in certain configurations, the attestation message includes a validity period 216. Certain inexpensive timekeeping methods can have "overflow" limitations; e.g., a short timing counter may "roll over" frequently. The validity period ensures that the attestation protocol remains device-agnostic and usable by even relatively simple devices. Moreover, in other implementations, the validity period may also provide an additional tamper-check, in conjunction with time stamp information 202.

In some embodiments, the attestation also includes a textual (human readable) string format location stamp 218 (e.g., 11 Elm Street, No. 242, San Francisco, Calif. 95014-3202, USA, etc.).

In one embodiment, the attestation message location stamp 204 comprises a plurality of data elements disposed in a prescribed format, which may be "open" or alternatively proprietary in nature.

In the exemplary attestation message 200 of FIG. 2A, the location stamp 204 consists of multiple Geographic Data Structure "sentences" from a Magellan™ or similar GPS device. Each sentence of GPS data is independent from other sentences. Each sentence has a two (2) letter prefix that defines the device that uses that sentence type. For example, a GPS receiver has a prefix GP. The two (2) letter prefix is followed by a three (3) letter sequence that defines the sentence contents. Vendor specific sentences are specified with the letter P and are followed with three (3) letters that identify the manufacturer controlling that sentence. For example a Gannin™ sentence starts with PGRM, and Magellan sentence starts with PMGN. FIG. 2B illustrates various GPS sentence formats useful with various embodiments of the invention.

The attestation message may also optionally include header information 214. Header information generally captures miscellaneous information. For example, a header may include information such as a version, a revision, a serial number, a signature algorithm identifier (e.g., to specify a particular signature algorithm when multiple algorithms are possible) attestation issuer information, validity information, etc.

In another variant, the attestor/attestee device may include a camera of the type now ubiquitous in the cellular and smart-phone arts (e.g., CCD (Charge Coupled Device), CMOS (Complementary Metal-Oxide Semiconductor), etc.) which can be used during the attestation process to capture one or more images of: (i) the location of where the attestation occurred (i.e., a picture of the recipient's mailbox, installed attestation device, etc.); (ii) a picture of the recipient themselves; and/or (iii) a picture of a digital information element such as a bar code label, UPC symbol, etc. which can be read.

Similarly, readouts from a bar code or other such data symbol may be stored within the digital attestation message as well, or in place of the image of the bar code/symbol. In this fashion, yet further evidence supporting the attestation may be obtained.

In another variant, a digital representation of a recipient's actual handwritten signature may be included in the attestation message (such as via a "soft" signature pad of the type well known in the art).

While the foregoing elements of the attestation message are shown with respect to the exemplary attestation messages of FIGS. 2 and 2A, it is appreciated that attestation messages implementing the principles of the invention are highly flexible by nature, and may either (i) assume a standardized or "universal" open format (for, inter alia, widespread use by a population of third party developers and CE implementers), or (ii) a proprietary, "closed" format (wherein the format may vary greatly from vendor to vendor or specific implementation to implementation).

Under the open protocol model (i), such an open protocol should ideally enable virtually any third party developer to deploy (possibly under license, etc.) a compatible attestor 102/attestee 104 process or device. Thus, unlike prior art closed systems, an open protocol will allow any attestor and attestee to participate in attestation exchanges without a previous affiliation. As discussed in greater detail herein, such an open protocol could be installed on a broad spectrum of hardware, including without limitation WLAN access points, femtocells, cell phones, laptop computers, PDAs, smartphones, etc.

Methods—

While the following discussion describes a substantially unidirectional attestation process, it is appreciated that unidirectional operation is in no way a requirement of the present invention. In fact, in certain embodiments, bi-directional attestation implementations (e.g., where an attestee 104 is also an attestor 102, and vice versa), may be interchangeable or even preferable to a unidirectional system.

Figure 5:
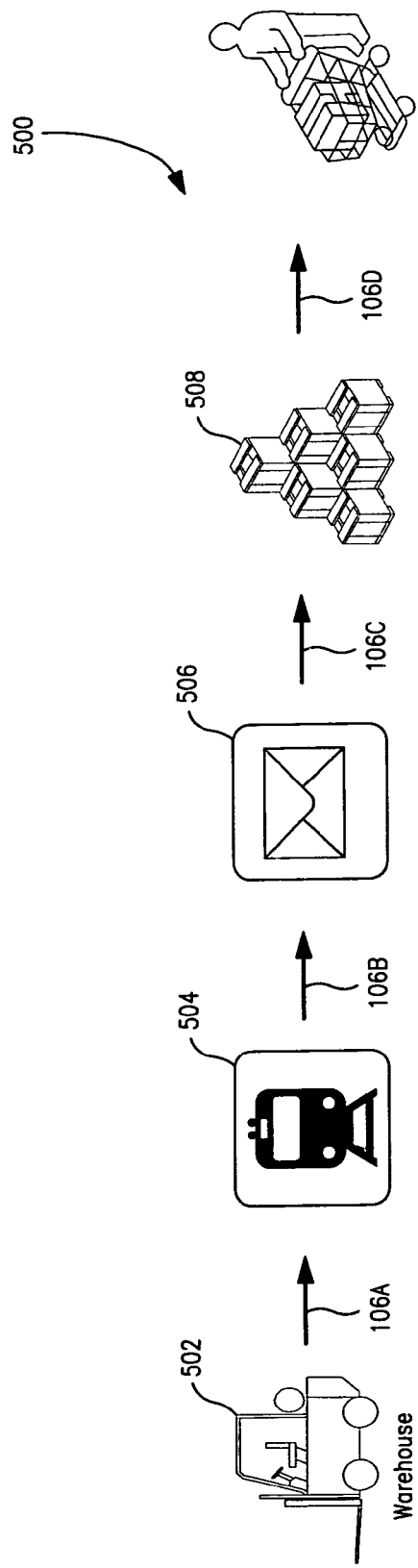
FIG. 5 is a graphical illustration of one chained attestation network, comprising several attestation exchanges, in accordance with one embodiment of the present invention.
Figure 5A:
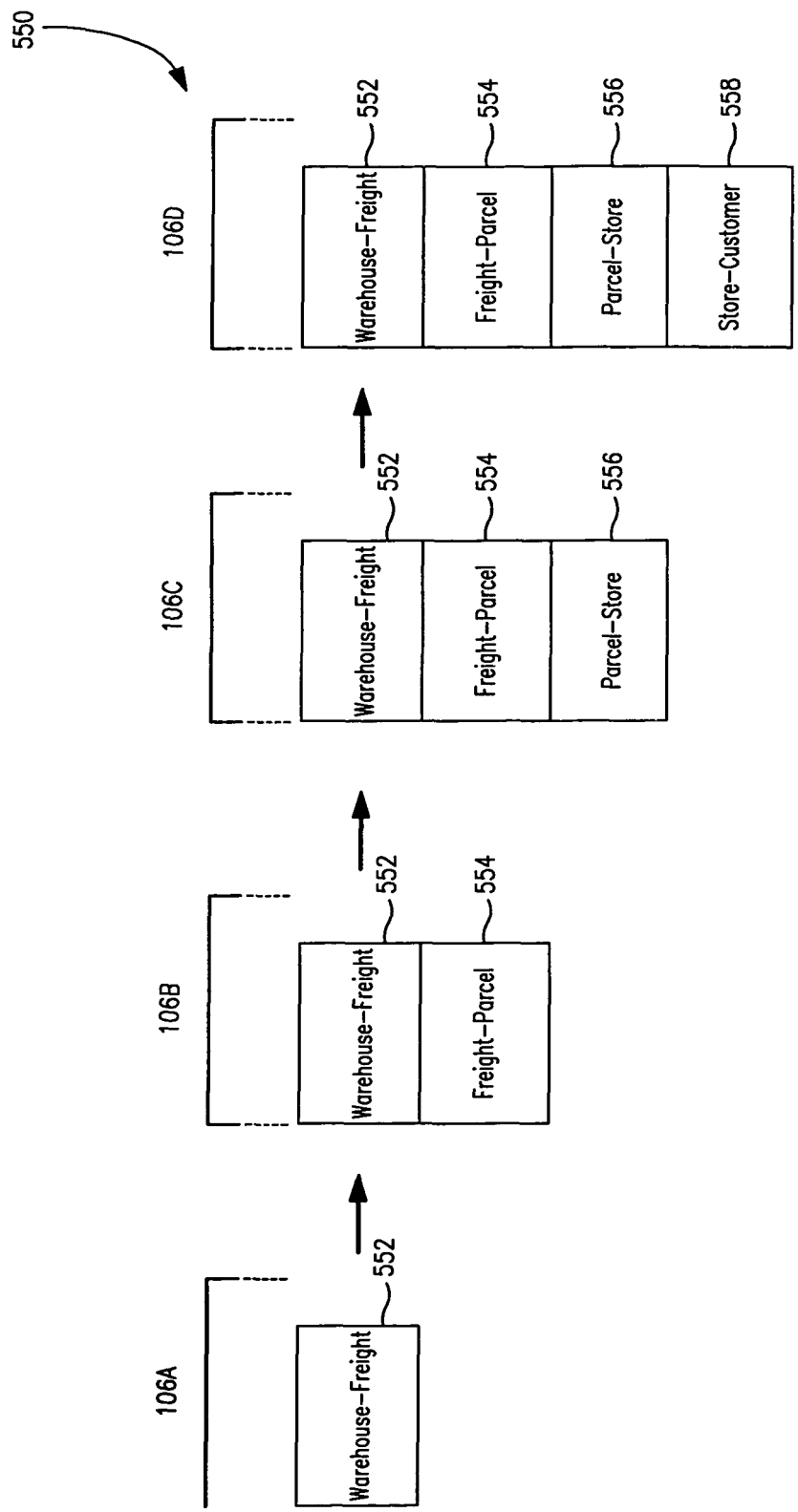
FIG. 5A is a graphical illustration of the propagated attestation message of the attestation network of FIG. 5, in accordance with one embodiment of the present invention.

Furthermore, while following discussion describes a two-party system (i.e., attestor, attestee), the following processes are equally suitable for larger party systems. See the discussion of the exemplary chained message exchange of FIGS. 5 and 5A provided subsequently herein. Larger party systems may include proxy devices, intermediary entities, intermediary attestee/attestors, etc. Such information may be protected (e.g., encrypted, hashed, etc.) during the information transfer between attestee and attestor so as to prevent surreptitious interception (e.g., "man-in-the-middle" attack) and corruption, especially where the data is transferred over unprotected links (e.g., Wi-Fi interface, Internet, etc.) via one or more proxy or intermediary devices. Such chained approaches may be useful in a number of cases, including: (i) where additional processing of the attestation data is required before exchange or delivery to the other device; and (ii) where multiple "serial" attestations are required (e.g., where the customer's attestation record is desired to include both the attestation of delivery to them, as well as other entities in the delivery chain (e.g., one carrier delivers to another).

Moreover, it will be recognized that while the following process presented is described within the context of an attestor 102 and attestee 104, such entities do not necessarily refer to a person, or apparatus actuated by a person. Completely automated embodiments, and embodiments having purely incidental human interaction, are also envisioned consistent with the invention. In fact, in one such embodiment, the attestation transaction is completely automated. For instance, when the attestor and attestee are brought within proximity of one another, an attestation exchange is triggered (i.e., no user interface interaction is necessary). In one exemplary implementation, the automated exchange is triggered via radio frequency communication between the two devices; e.g., via a beacon or probe signal emitted by one device and detected by the receiver of the other, or detected using near-field signal detection. A standardized protocol is used to exchange messages necessary to implement the attestation methodology described herein.

It will be appreciated that while not a requirement of practicing the invention, certain embodiments utilize close-range communications so as to inter alia (i) reduce the radiated power requirements, and hence increase battery life, of portable attestation devices; (ii) limit the reach of such signals in terms of distance, thereby minimizing the opportunity for surreptitious interception or use by another (unintended) recipient of the signal, and/or instances of "false attestation"; and (iii) reduce the likelihood of overlap of signals from various similar devices in high-density applications such as apartment buildings or complexes, office buildings, etc. Mechanisms for differentiating individual devices in such high-density applications may also be used, as described in greater detail subsequently herein.

It will also be appreciated that while the attestation devices used with the exemplary embodiments of the invention (described in greater detail subsequently herein) are individually or self-powered devices (i.e., each has its own power supply), a passive or "backscatter" approach may also be used consistent with the invention, somewhat akin to extant "passive" RFID technology. In such a configuration, the attestor or attestee may be unpowered and passive, such that it requires the radiated energy of an interrogation signal to be activated, generate data, and transmit a return signal to the transmitting device.

Figure 3:
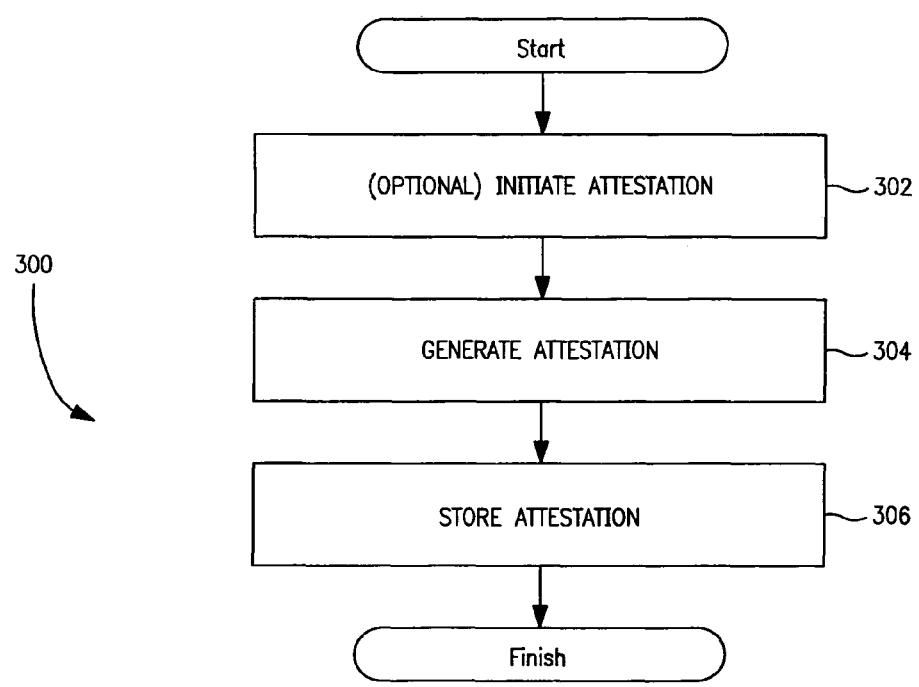
FIG. 3 is a logical flow diagram of an exemplary embodiment of the generalized process for digital attestation between an attestee and an attestor, in accordance with the present invention.

Referring now to FIG. 3, one exemplary embodiment of the generalized method 300 for attestation according to the invention is described.

At optional step 302, the attestee 104 or attestor 102 initiates one or more attestation exchanges. In one exemplary attestation exchange, the attestee requests or initiates an attestation procedure with the attestor. In an alternate exchange, the attestor requests or initiates an attestation procedure with the attestee. Hence, advantageously, the method can be initiator-agnostic (i.e., either entity can initiate or be the "active" party, with the other party being "passive"). In one variant, the attestation request is actuated by the user of the attestee or attestor. In another variant, the attestation request is automatically triggered based on one or more triggering events, such as those described above. In yet another embodiment, the attestation request is constantly broadcast (such as by an attestor).

In one exemplary variant, the attestation request is triggered by a user interaction, such as a button press (e.g., fixed function key or soft function key), or initiation of a function or menu option of a user interface, at either the attestee 104 or attestor 102. For example, a deliveryman seeing a small notification placard may press a button or initiate a function on his attestation device, thereby triggering an attestation response from an attestor device. Conversely, in a two-party interaction, a parcel recipient with an attestor device may press a button, to initiate an attestation exchange with the deliveryman's attestee device.

In one embodiment, the attestee or attestor is prompted with user interface operations to allow entry of additional details. For example, a deliveryman may additionally enter information such as success or failure of delivery, number of attempts, a notification of the next future attempt, cash required or received on delivery, etc.

As previously mentioned, in one embodiment, the attestor 102 can blindly broadcast a beacon signal. The beacon signal includes information useful for initiating an attestation, such as the attestor device location. Thus, for instance, a nearby attestee 104 can automatically trigger an attestation response if the distance between the attestee and the attestor is below a proximity threshold. In another example, the beacon signal may include information such as an attestor type. For example, a deliveryman's attestee can limit its responses to parcel reception attestor devices only; alternate attestor devices, such as for fleet tracking, are disregarded.

In one variant, the attestation request can only be triggered at a specific time, or during a range of times. In such implementations, an attestor 102 or attestee 104 only responds to attestation requests during specific times (e.g., up to Midnight, only during business hours, etc.). Such limited operation can be useful for user privacy. For instance, an attestee device which doubles for personal use (such as a cell phone), should not accept nor request attestation past regular working hours (i.e., to protect the cell phone user's privacy). In a similar variant, the attestation request can only be triggered at specific locations, or geographic ranges. Other schemes for requesting, initiating, and/or triggering message exchanges are readily apparent to those skilled in the arts given the contents of the present disclosure.

In another aspect of the invention, the attestation request includes one or more tokens or identities, for independent verification of either the attestee 104 or attestor 102. In one example, a request from the attestee includes an identification token, such that the attestor may verify the attestee identity. In another example, a beacon from the attestor includes an identification token, such that the attestee may verify the attestor identity. Proper identity verification may be required to continue the attestation process.

In one embodiment, the token is tied to a unique user identity. For example, the identification token may be a cellular device identifier, such as an IMSI (International Mobile Subscriber Identity), a TMSI (Temporary Mobile Subscriber Identity), a RNTI (Radio Network Temporary Identifier), etc. In alternate embodiments, the token is a non-unique identifier, such as an address, vendor name, location name, etc. For instance, a deliveryman dropping a package off in a strip mall may need to differentiate between multiple wireless attestor devices having overlapping coverage areas. In these cases, the deliveryman doesn't require a unique identifier. The deliveryman only needs to differentiate between various attestors (services or devices). Once the deliveryman selects the proper attestor, he can initiate the attestation exchange. Similarly, an attestor can offer multiple attestations (i.e., for example, in a condominium complex). Thus, a deliveryman may select the proper attestor, based on e.g., a last name, apartment number, etc.

At step 304, the attestor 102 generates an attestation 106. In one exemplary embodiment, an attestation includes a time stamp 202, a location stamp 204, a nonce 212, and a digital signature 206. The attestor may generate attestations only when initiated (see the previous optional step 302), or continuously generates and broadcasts attestations.

In one embodiment, the attestor 102 generates a location stamp 204 dynamically. In one implementation, the attestor updates its current location stamp based on a positioning device, such as a GPS receiver, or GSM localization service. The location stamp may be a calculated or derived location (e.g., latitude, longitude, etc.), or the location stamp may include information useful for calculating or deriving a location (e.g., Magellan Geographic Data Structure, etc.) In alternate embodiments, the attestor has a pre-defined its location stamp. In one such variant, the attestor uses a location which is stored internally.

The location stamp 204 may include for example a text (human readable) description of its location (e.g., an address, a string descriptor, latitude/longitude coordinates, etc.). In alternate embodiments, the location stamp is formatted for software constructs, (e.g., proprietary, encrypted, or otherwise illegible).

The attestor 102 may generate its time stamp 202 independently. In one variant, the attestor maintains an internal clock such as via a standard crystal oscillator (e.g., an XO (Crystal Oscillator), a VCXO (Voltage Controlled Crystal Oscillator), a TCXO (Temperature Controlled Crystal Oscillator), VCTCXO, etc.). In alternate implementations, the attestor receives its time stamp from an external time reference (e.g., GPS time, IEEE-1588 Precision Time Protocol, etc.) via a wireless (or wired) interface.

The exemplary time stamp 202 is in one configuration a text (human readable) description of the current time (e.g., HH:MM:SS, DD:MM:YY, etc.), or alternatively may be formatted for software constructs, (e.g., a running counter, machine time, etc.).

In another embodiment, the attestor 102 conditionally generates the attestation 106 based on one or more considerations or conditions precedent. Such additional considerations may be necessary to further identify malicious activity, or for business reasons. For example, the attestor may consider the time of the request before generating the attestation. In some cases, the attestor may restrict attestations before or beyond a certain time range (e.g., working hours, etc.). In yet other cases, the ability to attest beyond a certain time range may have cost implications, e.g., "delinquency" fees, or refunds. In yet another case, the attestation may be required within a certain time period (i.e., a delivery man who must deliver within a time limit)

Moreover, in some cases, the attestor may compare its time reference to a time reference embedded within the request. Significant differences in times may indicate some form of malicious activity (e.g., playback attacks, man-in-the-middle attacks, etc.). In another variant, the attestor evaluates user input before generating the attestation (e.g., via user interface prompts, button presses, etc.). In yet another variant, the attestor evaluates the attestee 104 device attributes before generating the attestation (e.g., parcel delivery service attestee, fleet tracking attestee, mail attestee, etc.).

Generally, it should be appreciated that the attestor may function as a proxy for a human recipient. Thus, considerations for a human recipient may be automated and incorporated as a matter of operation for the attestor device. For example, attestation can be denied for an untimely request, suspicious behavior, and/or unwanted requests. Other denial considerations should be readily apparent to any artisan, given the contents of the present disclosure.

In the exemplary implementation, a digital signature 106 is generated by the attestor 102 for later verification of the attestation. In one embodiment, the digital signature is generated with authentication information to verify that the attestation was generated by the attestor at the specified time and location. Such information includes for example one or more of: (i) attestor identity, (ii) a unique device ID, (iii) time stamp 202, (iv) location stamp 204, and/or (v) random nonce 212 (to further strengthen the signature). The aforementioned random nonce mitigates the threat of pre-encryption attacks (e.g., "rainbow tables"), and reply attacks. Furthermore, in certain embodiments, an attestee device ID can also be added to the generated message to identify the attestee device.

In one embodiment, the digital signature 206 verifies the integrity of the attestation 106. The digital signature uses a data hash, such as MD5, SHA1, SHA2, etc. The attestation message may also use key cryptography (private/public, shared, etc.), encryption, etc., in addition to the digital signature. Such countermeasures may completely or partly encrypt, and/or completely or partly protect the integrity of the attestation message to detect and frustrate modification, falsification, or other malicious tampering, and protect confidentiality.

In one aspect of the invention, the attestation message 106 is generated according to a publicly available protocol as previously described herein. That is to say, the attestation message is generally device-agnostic, and may be generated regardless of the capabilities of the attestee 104 or attestor 102 devices. Furthermore, the attestation may be generated without any a priori relationship between the attestor and the attestee. In one exemplary embodiment, the publicly available protocol enables any appropriately enabled attestee device to request an attestation message from an arbitrary attestor. Similarly, the publicly available protocol will also allow any attestor device to generate the attestation message for an arbitrary attestee device, without prior knowledge of the attestee. For example, a cellular device might request attestation from an otherwise restricted femtocell (e.g., Closed Service Group (CSG) femtocells). In another example, an RFID or near-filed communication (NFC) device (see e.g., ISO/IEC 18092:2004 entitled "Information technology—Telecommunications and information exchange between systems—Near Field Communication—Interface and Protocol (NFCIP-1)" dated 2004, incorporated herein by reference in its entirety) might request attestation from another RFID or NFC device, without any previous affiliation. Other combinations, including multi-mode operation (multiple radio operation capabilities e.g., GSM (Global System for Mobile communication), EDGE (Enhanced Data rates for Global Evolution), WCDMA (Wide-band Code Division Multiple Access), etc.), will be apparent to the skilled artisan when provided the present disclosure.

In one embodiment, the attestee 104 and/or attestor 102 have software-based implementations of the publicly available attestation protocol and use existing modem and radio link apparatus. The flexibility of software implementations enables device agnostic implementations (i.e., not tied to hardware specific components). However, the rigidity of hardware implementations may be required for closed systems. In one such variant, previously deployed or installed radio devices ("legacy" devices) can be updated with software for attestee or attestor functionality. Such software may also be made "open source", such that it is readily available to a user for installation on their device at no cost, such as via an Internet or website download, CD-ROM, or other means.

In one embodiment, the publicly available attestation protocol includes a notification or negotiation of one or more protocol versions. Such a protocol version exchange enables two devices of different capabilities to agree on one coherent version of the protocol to use (i.e., version control). Within open protocol systems, the population of devices may have varying degrees of capabilities, especially as newer protocol versions are released. Moreover, under the aforementioned "open source" availability model, varying levels of functionality may be enabled in the software, depending on whether the user has a "free" license, or alternatively has purchased a version with enhanced capabilities over and above those of the free version.

At step 306, the attestee 104 receives and stores the attestor-generated attestation 106. In one embodiment, the attestation message is conditionally stored based on one or more considerations or criteria. In one such variant, the attestee considers one or more parameters embedded within the header of the attestation. Such parameters may include for example a version number or ID, a revision number or ID, a serial number, a signature algorithm, attestation issuer information, validity information, etc. In one example scenario, an attestee may determine that an unsolicited attestation message is from an "imposter" attestor, and ignore the attestation. Similarly, an attestee may determine that the attestation message is improper in form, and thus possibly malicious or fraudulent.

In another variant, the attestee 104 may evaluate internal considerations and/or user preferences, before storing an attestation 106. For example, a user may prefer not to receive attestations during non-business hours (for the aforementioned reasons); accordingly, unsolicited broadcast attestations received at night or on weekends may simply be ignored.

In one embodiment, the attestor 102 also stores the attestation message 106 (in addition to the attestee). For example, the attestor stores the attestation message, and any additional details provided by the attestee (e.g., such as success or failure of delivery, number of attempts, a notification of the next future attempt, cash due or received on delivery, etc.). In another variant, the attestor provides a notification for a user interface, such that the user can see the most recent record of attestation exchanges. The attestor or attestee devices may also be configured to generate and store a log or history of attestation exchanges or events if desired, and associated times/dates (and other information, such as attestor/attestee device ID, geographic location, etc. if desired).

Figure 3A:
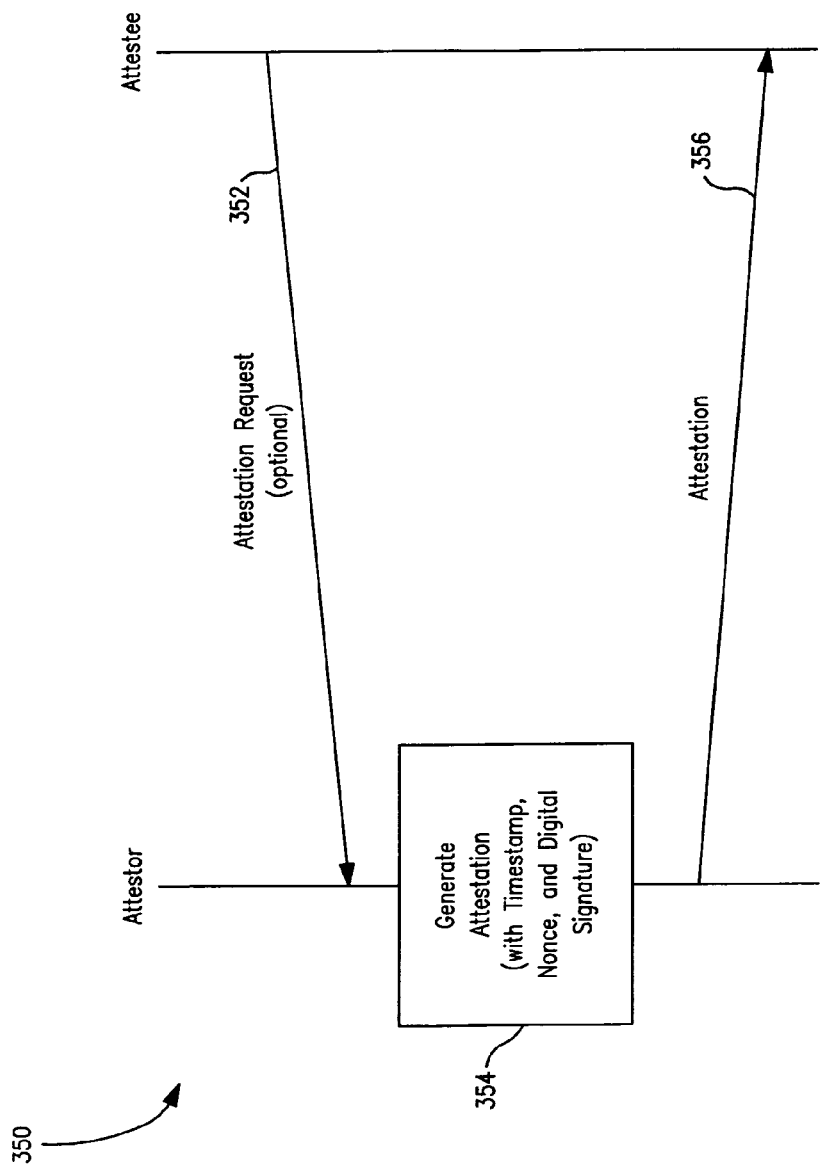
FIG. 3A is a ladder diagram illustrating one implementation of the generalized process for digital attestation between an attestee and an attestor of FIG. 3.

FIG. 3A illustrates one exemplary message exchange of the generalized process for attestation 300 of FIG. 3. At step 352, the attestee 104 transmits an (optional) attestation request. At step 354, the attestor 102 generates an attestation including a timestamp 202, location stamp 204, nonce 212, and digital signature 206. Finally, at step 356, the attestation 106 is transmitted.

Figure 4:
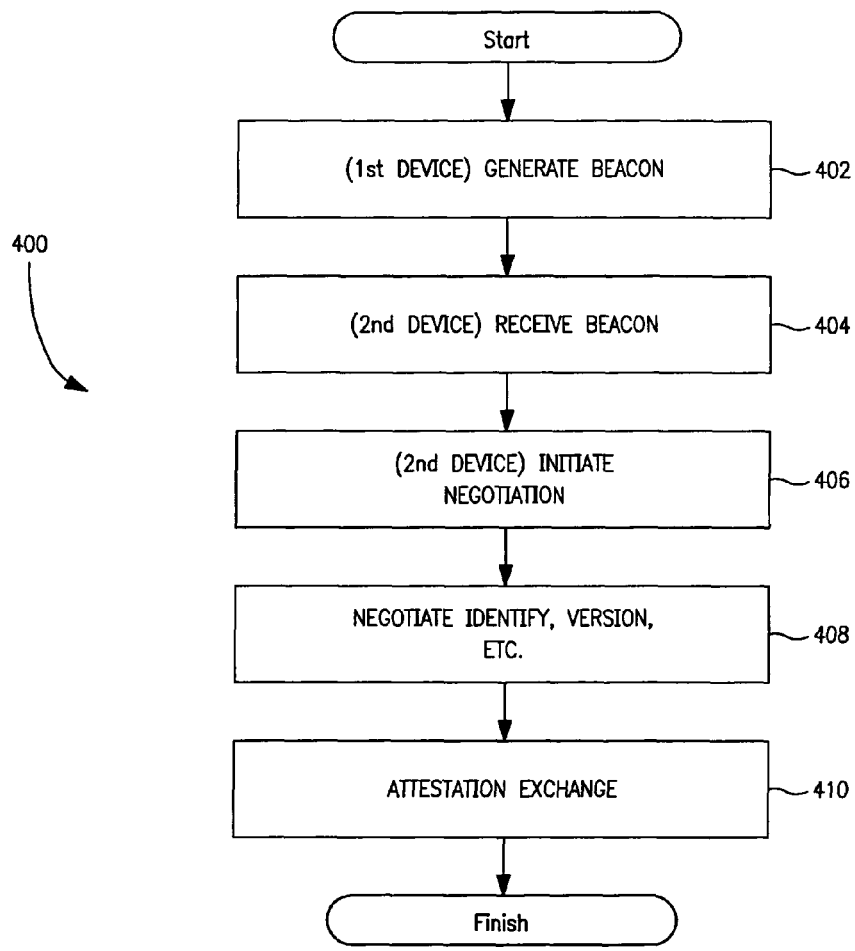
FIG. 4 is a logical flow diagram of another exemplary embodiment of the automated process for digital attestation in accordance with the present invention.

FIG. 4 illustrates another embodiment of the method of attestation according to the invention. In this method 400, a first device (either attestor or attestee) device issues a periodic or continuous radio frequency beacon signal (step 402). When the second device (attestee or attestor) device is brought within sufficient range to receive and decode the beacon (step 404), the second device then initiates a negotiation process (step 406) between the two (2) devices so as to negotiate items such as identity, protocol version, and other parameters which may be required to implement a suitable radio frequency channel for passing attestation data between the devices (step 408). Once the negotiation is completed sufficiently, the attestation exchange between the devices is performed (step 410), as previously described herein. For instance, the devices may exchange an attestation message 200 including a signature, location, and timestamp, etc.

Figure 4A:
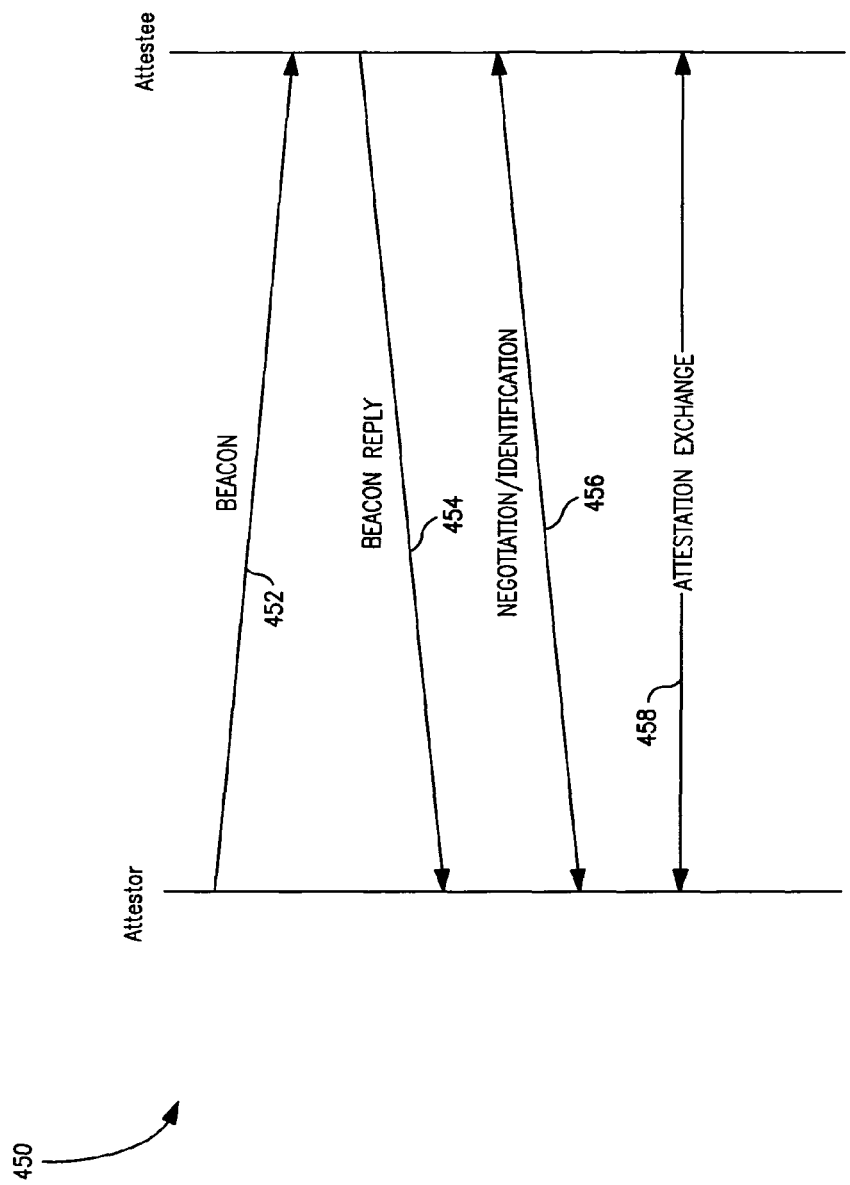
FIG. 4A is a ladder diagram illustrating one implementation of the method of FIG. 4.

FIG. 4A illustrates an exemplary implementation of a message exchange according to the method of FIG. 4. As shown, the beacon signal or message 452 is sent from the first device (here, attestor, but could also be the attestee) to the second device.

This may be in the form of a broadcast (i.e., with no known identity or addressing information on the prospective receiver), or as a directed communication (i.e., particularly addressed to a known receiver device, or at least class or category of receiver devices (e.g., any Bluetooth-enabled device).

The receiving device then issues a beacon reply message 454, and institutes a negotiation exchange 456 between the devices as previously described. The attestation exchange 458 is then performed.

In another variant of the invention, the first and second devices (i.e., attestor and attestee for a first attestation) can switch roles within the same transaction, whereby the attestor becomes the attestee, and vice versa. In such a case, the two attestations (i.e., one in the first device and one in the second device) can be generated in parallel, or in sequence as desired. Hence, two similar but generally not identical attestations may be generated (they may differ slightly in time stamp, and/or location, for example). Generally, the digital signature or hash will differ significantly; i.e., the devices may use the same hashing algorithm but differ in cryptographic data elements (e.g., encryption keys) to independently generate a digital signature. The two attestations may then be compared to ensure that (i) the signatures are the different (while still remaining valid), and (ii) the other values (time and location, etc.) are within a prescribed range of one another.

Chain Delivery Variants—

It is not an uncommon business practice to "chain" multiple delivery services for the efficient distribution of goods. As can be appreciated, a simple attestation may be inadequate for such distributed delivery systems. For example, a single entity in the distribution network can delay delivery, even if all other members of the distribution system are timely. Accordingly, in one aspect of the present invention, each attestation transaction of a "chained" delivery network can be propagated forward, thereby ensuring full accountability for and transparency of the distribution network.

Referring now to FIG. 5, one illustrative "chained" distribution network 500 for consumer goods (here, television sets) is depicted. An originating television warehouse 502 may provide a television set, which is carried by freight 504, to a distribution center. From the distribution center, the television is carried by parcel 506 to a store 508 holding a customer ticket. During each "leg" of the television distribution, an attestation message is generated and propagated to the next leg (106A, 106B, 106C, 106D). Once the customer accepts delivery of the television, the chained attestation message 106D is stored along with the customer ticket, thereby concluding the transaction. In some embodiments, the customer may retain the attestation log 106D. In alternate embodiments, a distribution network manager receives the attestation log. A distribution network manager can for example use such information to smooth further operations based on historical attestation logs.

Referring now to FIG. 5A, one exemplary attestation 550 for the aforementioned chained distribution network is shown. Each leg of the distribution process has attestation information e.g., time stamp 202, location stamp 204, information. As shown, the chained attestation maintains a distinct time stamp, location stamp for each leg. Thus, as shown, a first attestation 106A comprises the attestation details 552 exchanged between the warehouse and the freight service. The second attestation message 106B comprises the attestation details 554 exchanged between the freight service and the parcel service. In some embodiments, the digital signature may be regenerated on each leg. In alternate embodiments, the digital signature may be individual, each leg having its own signature.

The cumulative record of attestations can be used to examine where unnecessary delays have taken place. For example, if the freight took significantly longer to deliver than originally expected, then the customer's complaints (with reference to the chained attestation message), would be fairly directed to the freight service rather than the store manager.

Apparatus—

Exemplary apparatus useful for practicing one or more aspects of the present invention are now discussed in greater detail. While the following discussions are divided into "attestee" (FIG. 6) and "attestor" (FIG. 7) type apparatus, it is appreciated that an "attestor" device may also be an "attestee" device, and vice versa. In one exemplary embodiment, the attestation exchange is between two (2) substantially asymmetric or heterogeneous devices (e.g., between a cell phone and a femtocell). Conversely, in an alternate embodiment, the attestation exchange is between multiple substantially similar wireless devices (e.g., WLAN, Bluetooth, Wireless USB, NFC, etc.). Additionally, an attesting device may change over to an attestee device (and vice versa). A device may offer both attestor and attestee functions simultaneously.

Thus, as used herein, the terms "attestor", and "attestee" include but are not limited to "client device", "end user device", "UE", "station" (e.g., Wi-Fi STA), "base station" (e.g., femtocell, macrocell, etc.), and "access point" (e.g., Wi-Fi AP), RFID-enabled device, and/or NFC device. Moreover, such apparatus may include for example cellular telephones, smartphones (such as for example an iPhone™), Wireless LAN devices, ad hoc networking devices, personal networking devices, personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, macrocells, femtocells, picocells, NodeBs, eNodeBs, Home NodeBs, Home eNodeBs, etc. residential gateways, wireless routers, RFID or NFC chips or transceivers, or any combinations of the foregoing.

The following discussions of exemplary apparatus are provided merely to illustrate representative apparatus for such conceptual entities, and should not be construed as limiting in any way.

Attestee Apparatus—

The attestee may selectively request or detect one or more attestation services based on location, time, attestor type, and/or attestor identity. For example, a user may desire attestation limited to a specific type of attestor (such as delivery service reception only). In another example, a user may desire attestation limited to a specific location (such as a specific address). In yet another example, a user may only allow automated attestation during business hours, or attestation from a listing of attestors with certified vendors.

Moreover, the attestee can consider other factors, criteria, or parameters in determining how to adjust its operation. For instance, an attestee may consider other operation parameters of the nearby attestors; an attestor having a different protocol version or incompatible format may not be accepted. Alternatively, an attestor having a different version may support other features, which the attestee may or may not require.

Figure 6:
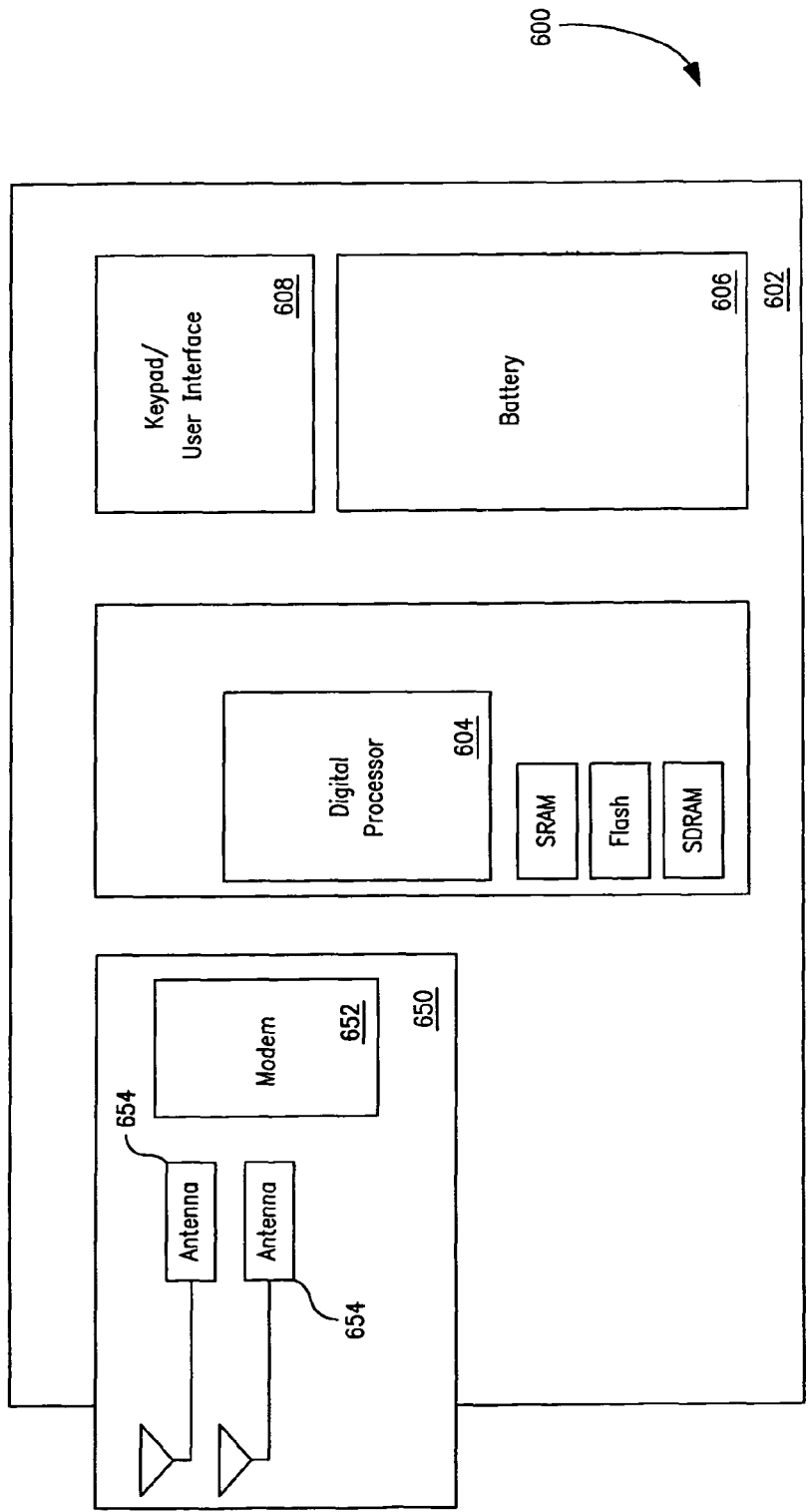
FIG. 6 is a block diagram of one embodiment of an attestee apparatus configured in accordance with the present invention.

Referring now to FIG. 6, one exemplary attestee apparatus 600 useful in implementing the methods of the present invention are illustrated. The apparatus disclosed comprises, inter alia, a device such as a smartphone, portable computer, or mobile communications device capable of identifying, requesting and storing received attestations. The identification, request for, and storing of attestations are preferably performed in software, although hardware/firmware embodiments are also envisioned.

The attestee apparatus 600 includes one or more substrate(s) 602 that further include a plurality of integrated circuits including a processing subsystem 604 such as a digital signal processor (DSP), microprocessor, programmable logic device (PLD), gate array, or plurality of processing components as well as a power management subsystem 606 that provides power to the attestee 600, a user interface (UI) subsystem 608, and a radio subsystem 650. As used herein, the term "integrated circuit (IC)" refers to any type of device having any level of integration (including without limitation ULSI, VLSI, and LSI) and irrespective of process or base materials (including, without limitation Si, SiGe, CMOS and GaAs).

The processing subsystem may also comprise an internal cache memory. The processing subsystem 404 is connected to a memory subsystem comprising memory which may, for example, include SRAM, Flash and SDRAM components. The memory subsystem may implement one or a more of DMA type hardware, so as to facilitate data accesses, as is well known in the art.

The illustrated power management subsystem (PMS) 606 provides power to the attestee device, and may include an integrated circuit and/or a plurality of discrete electrical components. In one exemplary portable attestee apparatus, the power management subsystem 606 interfaces with a rechargeable battery power source within the attestee device. Recharging may be via cord or cable, inductive power supply (e.g., coils in proximity to one another), or any other such mechanism.

The user interface subsystem 608 includes any number of well-known I/O devices including, without limitation: a keypad, touch screen (e.g., multi-touch interface), LCD display, SFKs, FFKs, backlight, speaker, and/or microphone. However, it is recognized that in certain applications, one or more of these components may be obviated. For example, PCM-CIA card type embodiments may lack a user interface (as they could piggyback onto the user interface of the host device to which they are physically and/or electrically coupled).

The apparatus 600 may further include optional additional peripherals including, without limitation, one or more GPS transceivers, or network interfaces such as IrDA ports, Bluetooth transceivers, NFC, USB, FireWire™, WiMAX transceivers, etc. It is however appreciated that these components are not required for operation of the attestee in accordance with the principles of the present invention.

The radio subsystem 450 includes one or more RF front-ends 652, and a plurality of decoding resources 654. The RF front-ends 652 of the illustrated embodiment generally include the antennas and any analog stages used to convert a received radio signal to a digital signal. A RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, RF front-ends are generally adapted to a very limited range of operation.

In some instances, multiple RF front-ends 652 may be required for different radio frequencies, and/or radio access technologies (RATs). For example, in the illustrated embodiment, the attestee has two (2) RF front-ends. It is readily appreciated that in some embodiments, the RF front-ends may support any combination of MIMO (Multiple Input Multiple Output), SIMO (Single Input Multiple Output), MISO (Multiple Input Single Output), and SISO (Single Input Single Output) antennas.

The plurality of decoding resources 654 of the illustrated embodiment includes apparatus adapted to decode received data. Generally, decoding resources may include such elements as processing elements, application specific circuitry, and/or other common communication elements, such as Fast Fourier Transforms (FFT) processing, Multiply Accumulate (MAC) logic, arithmetic logic units (ALU), floating point logic, etc.

In multimode systems, multiple types of RF front-ends 652 and decoding resources 454 may be intermixed, and/or interchanged. In some cases, the functionality of one or more components may be performed by a single component. The numerous possible combinations of the various RF front-ends and decoding resources are readily appreciated by those of ordinary skill in the art given the present disclosure.

As previously described, in various aspects of the present invention, the processing subsystem 604 is specifically adapted to request attestations. In one such embodiment, the processing subsystem operates a user interface 608, enabling an actuation by the user (such as button press, etc.) of the attestee apparatus 600. Alternatively, in one embodiment, the attestee apparatus is triggered by nearby attestor devices. In such alternate embodiments, the processing subsystem can receive unsolicited attestations (e.g., such as by broadcast attestations, attestor initiated attestations, etc.), and determine if the attestation is either (1) of interest, (ii) fraudulent or otherwise compromised, and/or (iii) not applicable, or not of interest.

In another aspect of the present invention, the processing subsystem 604 generates or maintains one or more tokens or identities specific to the attestee apparatus 600, for independent verification of the attestee (at a later date). In one example, attestation requests from the attestee include the identification token, such that the attestor may verify the attestee apparatus identity. The token can be tied to a unique user identity. For example, the identification token may be a cellular device identifier, such as an IMSI (International Mobile Subscriber Identity), a TMSI (Temporary Mobile Subscriber Identity), a RNTI (Radio Network Temporary Identifier), etc.

Other variations of the processing subsystem 604 are readily apparent to one of ordinary skill, given the aforementioned discussion. Such variants include: storage medium for related notations and information, conditional apparatus for evaluating validity of attestations, restrictions on operation (e.g., only during business hours), etc.

Attestation messages are stored in the memory subsystem for later retrieval and use. All event data is electronically stored, and can be processed, archived, replicated, or trigger further action.

Attestor Apparatus—

Figure 7:
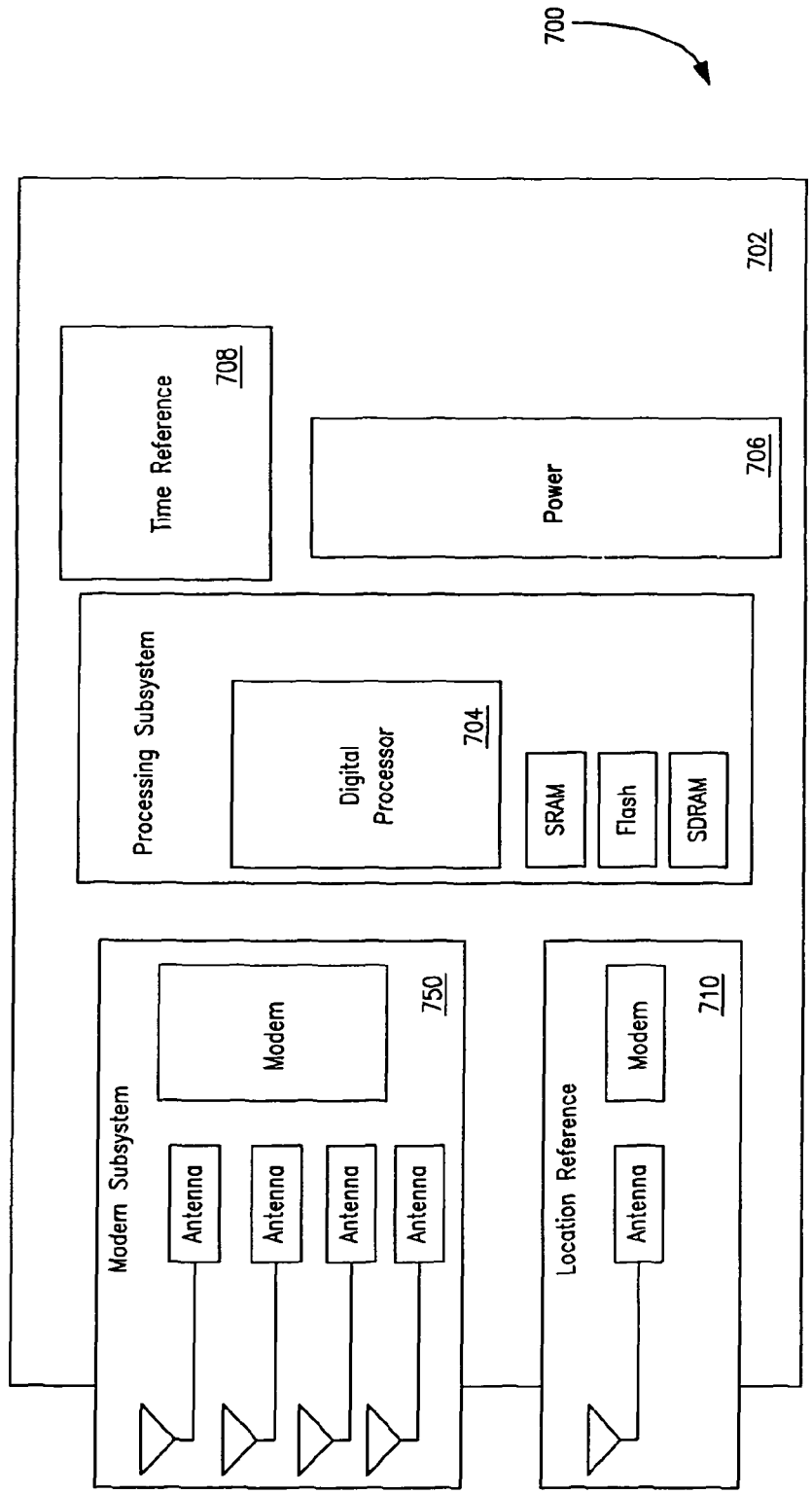
FIG. 7 is a block diagram of one embodiment of an attestor apparatus configured in accordance with the present invention.

Referring now to FIG. 7, one embodiment of attestor apparatus 700 implementing the methods of the present invention is illustrated. The attestor apparatus 700 includes one or more substrate(s) 702 that further include a plurality of integrated circuits including a processing subsystem 704 such as a digital signal processor (DSP), microprocessor, gate array, PLD, or plurality of processing components as well as a power management subsystem 706 that provides power to the attestor 700. A memory subsystem is also shown for storage of media, data and executable code.

The embodiment of the apparatus 700 shown in FIG. 7 at a high level includes a modem circuit 750 configured to receive requests for attestation, and transmit attestations. The attestations are each transmitted with a digital signature and one or more levels of encryption, to guarantee the authenticity of the attestation message. The modem subsystem includes one or more digital modems and a plurality of antenna.

The processing subsystem 704 may include a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem 704 is in data communication with one or more memory components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 7 includes various forms of volatile (e.g. SRAM, SDRAM, etc.) and non-volatile memory such as a hard disk drive (HDD), and/or Flash. Additionally, the processing subsystem may also comprise a cache to facilitate processing operations.

In one aspect of the present invention, the processing subsystem 704 is specifically adapted to generate an attestation message (e.g., the message 200 of FIG. 2). In one exemplary embodiment, the processing subsystem 704 is coupled to a time reference 708, and a location reference 710 which facilitate the generation of the message indigenously.

The time reference 708 can, as previously noted, be generated from an internal clock or oscillator circuit, such as via a standard crystal oscillator (e.g., an XO (Crystal Oscillator), a VCXO (Voltage Controlled Crystal Oscillator), a TCXO (Temperature Controlled Crystal Oscillator), VCTCXO, etc.). In alternate embodiments, the time reference is externally generated and coupled to the attestor 700 (e.g., GPS time, IEEE-1588 Precision Time Protocol, etc.).

Similar to the attestee apparatus previously described, the location reference is generated from a wireless positioning device 710, such as a GPS receiver, or GSM localization service. In one embodiment, the location reference provides a calculated or derived location (e.g., latitude, longitude, etc.). In another embodiment, the location reference is an array of information useful for calculating or deriving a location (e.g., Magellan Geographic Data Structure, etc.) In yet alternate embodiments (not shown), the location reference is a predefined location stored internally in the device, which may also be periodically refreshed or updated if desired (such as where the device is semi-mobile or portable in nature).

In one embodiment, the processing subsystem 704 is capable of generating a data hash, using encryption algorithms such as MD5, SHA1, SHA2, etc. In other embodiments, the processing subsystem may use key cryptography (private/public, shared, etc.), encryption, etc. in order to generate and/or secure the attestation message 200.

Once the attestation has been generated, in some embodiments, the processing subsystem 704 stores the attestation messages in the memory subsystem for later retrieval and use. In one variant, all event data is electronically stored, and can be processed, archived, replicated, or trigger further action.

Business Methods and Software Rules Engine—

It will be recognized that the foregoing network apparatus and methodologies may be readily adapted to various business models. Such models may be facilitated or implemented in certain cases via the attestation software described previously herein; e.g., in the form of a "rules engine" incorporated therein.

For example, in one such model, an attestor operator may charge for each attestation message generated. The attestation message charge may be at a flat rate (i.e., irrespective of package size, location, monetary value, etc.), or alternatively may be a function of one or more of the foregoing. For instance, in one variant, the greater the value of the delivered good or service, the greater the charge for the attestation. In another variant, the relative ease or proximity of the delivery to a given location (e.g., distribution point) is used as the measure of attestation charge; greater distance means greater cost to perform the attestation.

Similarly, in another example, attestation message service may be bundled together with another network service, for example, as part of a machine-to-machine (M2M) specific cellular plan as described in co-owned and co-pending U.S. patent application Ser. No. 12/231,095 entitled "Methods and Apparatus for Machine-to-Machine Based Communication Service Classes" filed Aug. 29, 2008, incorporated herein by reference in its entirety.

Moreover, as previously mentioned, the verifiable attestation has significant value for customers which require robust service. In fact, a customer may be willing to pay a premium to have attested service and/or delivery of goods. Similarly, a corporation's ability to verify delivery of a parcel with a secure attestation may be invaluable, such as to prevent fraud, monitor workforce efficiency, meet legal (e.g., service) requirements, and/or reduce insurance premiums.

Still further, an attestation software application may be written and sold for various equipment (either previously deployed or newly manufactured). For example, a corporation may cheaply upgrade its workforce capabilities, by purchasing attestee software for employee cellular devices. Similarly, a corporation may make attestor software freely available to its customer base, to promote and enforce reliable service. While not tangibly profitable, customers may react favorably to such good faith gestures.

It is also appreciated that the attestation methods and apparatus described herein may be used in support of insurance requirements; i.e., preferential insurance rates may be given to the carrier and/or customer based on the use of attestation methods or apparatus of the type described herein. For example, where a end user (i.e., addressee) of a parcel has an installed attestation apparatus, they can indicate this at time of ordering (e.g., via an Internet website, telephone call, etc.), and be afforded a cheaper shipping and/or insurance rate since the surety of delivery from the carrier (who may bear the risk of loss under UCC or other such laws) to the end user is more reliable and traceable.

Attestation data can also be garnered by a delivery service, carrier, or other entity and used to determine the performance of their service; e.g., on-time delivery, whether drivers have been "padding" their delivery schedules, whether the drivers are over-extended and hence not meeting delivery targets, etc. Moreover, for services or goods which are guaranteed to be delivered within a prescribed period of time (e.g., a pizza delivery within 30 minutes or it is free), the ability to obtain attestation data can be very useful.

Myriad other schemes for implementing attestation of goods or services will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus adapted to generate a digital attestation, the apparatus comprising:
   a radio interface;
   a time reference unit;
   a location reference unit;
   one or more processors; and
   a non-transitory computer-readable medium adapted to store instructions that, when executed by the one or more processors, cause the apparatus to:
   generate the digital attestation by:
      determining a location stamp comprising geo-location coordinates by the location reference unit;
      determining a time stamp by the time reference unit; and
      generating the digital attestation comprising the location stamp, the time stamp, and a secure signature;
   compare the digital attestation with a second digital attestation received from a wireless device to determine whether:
      the secure signature of the digital attestation differs from a second secure signature of the second digital attestation,
      the location stamp of the digital attestation and a second location stamp of the second digital attestation indicate physical proximity of the apparatus to the wireless device, and
      the time stamp of the digital attestation and a second time stamp of the second digital attestation indicate contemporaneous co-location of the apparatus to the wireless device; and
   when the comparison of the digital attestation with the second digital attestation is successful:
      store the digital attestation and the second digital attestation, and
      provide the digital attestation and the second digital attestation from storage in response to a request for the digital attestation and the second digital attestation.

2. The apparatus of claim 1, wherein the instructions, when executed by the one or more processors, further cause the apparatus to:
   transmit the digital attestation to the wireless device; and
   record an attestation event.

3. The apparatus of claim 1, wherein the apparatus generates the digital attestation in response to receipt of a request for digital attestation from the wireless device.

4. The apparatus of claim 1, wherein the radio interface comprises a near-field communication (NFC) interface compliant with ISO/IEC Standard 18092:2004.

5. The apparatus of claim 1, wherein the secure signature of the digital attestation comprises a digital signature generated by a cryptographic hashing algorithm.

6. The apparatus of claim 1, wherein the secure signature of the digital attestation comprises a signature generated based at least in part on one or more physical radio frequency channel parameters.

7. The apparatus of claim 6, wherein the one or more physical radio frequency channel parameters comprise a channel impulse response (CIR).

8. The apparatus of claim 1, wherein the radio interface comprises a wireless local area network (WLAN) or a wireless personal area network (WPAN) interface, the apparatus comprises a cellular smartphone, and the instructions comprise an application program added to the non-transitory computer readable medium after purchase of the cellular smartphone by a user.

9. The apparatus of claim 1, wherein the instructions that, when executed by the one or more processors, further cause the apparatus to ignore the second digital attestation received from the wireless device when the comparison of the digital attestation with the second digital attestation is not successful.

10. The apparatus of claim 1, wherein the apparatus and the wireless device have no pre-existing relationship with each other.

11. A method for securely recording contemporaneous co-location of a first device and a second device, the method comprising:
   at the second device:
   determining a location stamp comprising geo-location coordinates of the second device;
   determining a time stamp of the second device;
   generating an attestation comprising a secure signature of the second device, the location stamp, and the time stamp;
   transmitting the attestation to the first device;
   receiving a second attestation from the first device;
   comparing the attestation to the second attestation to determine whether:
      the location stamp of the attestation with a second location stamp of the second attestation, and the time stamp of the attestation with a second time stamp of the second attestation indicate contemporaneous co-location of the first device and the second device, and
      the secure signature of the attestation differs from a second secure signature of the second attestation;
   recording the attestation and the second attestation when the comparison of the attestation and the second attestation is successful; and
   displaying at least a portion of either the attestation or the second attestation to a user of the second device as evidence of contemporaneous co-location of the first device and the second device.

12. The method of claim 11, further comprising receiving by the second device a request for attestation from the first device, wherein at least the act of generating the attestation occurs in response to the request.

13. The method of claim 11, further comprising:
   receiving at the second device a beacon or probe signal from the first device;
   responsive to the receiving of the beacon or probe signal, causing a negotiation between the first device and second device; and
   upon successful completion of the negotiation, causing at least the act of generating the attestation.

14. The method of claim 11, further comprising the second device causing the first device to:
   determine the second location stamp of the first device;
   determine the second time stamp of the first device;

generate the second attestation comprising the second secure signature of the first device, the second location stamp, and the second time stamp; and transmit the second attestation to the second device.

15. The method of claim 11, further comprising the second device ignoring the second attestation from the first device when the comparison of the attestation and the second attestation is not successful.

16. An apparatus configured to receive a digital attestation from a second device, the apparatus comprising:
- a radio interface;
- one or more processors; and
- a non-transitory computer-readable medium adapted to store instructions that, when executed by the one or more processors, cause the apparatus to:
- receive and store a digital attestation from the second device, the digital attestation comprising a location stamp comprising geo-location coordinates, a time stamp, and a digital signature generated by the second device;
- generate a second digital attestation comprising a second location stamp, a second time stamp, and a second digital signature;
- compare the digital attestation from the second device with the second digital attestation to determine whether:
  - the location stamp of the digital attestation and the second location stamp of the second digital attestation indicate physical proximity of the apparatus to the second device,
  - the time stamp of the digital attestation and the second time stamp of the second digital attestation indicate contemporaneous co-location of the apparatus to the second device, and
  - the digital signature of the digital attestation differs from the second signature of the second digital attestation; and
- display to a user of the apparatus location information determined based at least in part on the location stamp, a time determined based at least in part on the time stamp, and an identification of the second device determined based on the digital signature, wherein the apparatus and the second device do not have any prior affiliation with one another.

17. The apparatus of claim 16, wherein the instructions, when executed by the one or more processors, further cause the apparatus to:
- determine whether the digital signature is valid; and
- record the digital attestation when the digital signature is valid.

18. A method for securely recording contemporaneous co-location of a first device and a second device, the method comprising:
- at the second device:
- receiving a first attestation comprising a first secure signature indicative of the first device, a first location stamp comprising geo-location coordinates indicative of a location of the first device, and a first time stamp indicative of a time of the first attestation;
- generating a second attestation comprising a second secure signature indicative of the second device, a second location stamp indicative of a location of the second device, and a second time stamp indicative of a time of the second attestation; and
- based on at least one condition of an attestation protocol:
  - recording the first attestation as an entry within a database,
  - transmitting the second attestation to the first device; and
  - displaying at least a portion of the first attestation to a user of the second device in response to a user requesting the entry,
- wherein the at least one condition of the attestation protocol comprises verifying contemporaneous co-location of the first device and the second device based on comparing the first location stamp to the second location stamp and the first time stamp to the second time stamp.

19. The method of claim 18, wherein the at least one condition of the attestation protocol further comprises one or more user defined preferences.

* * * * *